United States Patent
Koppelman

[11] Patent Number: 5,915,653
[45] Date of Patent: Jun. 29, 1999

[54] SPHERICAL MATING FAIRINGS FOR HINGELINE APPLICATIONS

[75] Inventor: H. John Koppelman, Seattle, Wash.

[73] Assignee: The Boeing Company, Seattle, Wash.

[21] Appl. No.: 08/581,820

[22] Filed: Jan. 2, 1996

[51] Int. Cl.$^6$ ..................................................... B64C 9/02
[52] U.S. Cl. ........................................................ 244/129.1
[58] Field of Search ............................... 244/129.1, 90 R, 244/213, 214, 215, 132; 16/250

[56] References Cited

U.S. PATENT DOCUMENTS

| | | | |
|---|---|---|---|
| 1,245,302 | 11/1917 | Ziehler | 16/250 |
| 1,385,002 | 9/1921 | Matranga | 16/250 |
| 2,238,991 | 8/1941 | Williams et al. | |
| 2,381,350 | 8/1945 | Hall | |
| 4,395,007 | 7/1983 | Owl, Jr. | |
| 4,471,927 | 9/1984 | Rudolph et al. | |
| 4,669,687 | 6/1987 | Rudolph | |
| 4,705,236 | 11/1987 | Rudolph | |
| 4,854,528 | 8/1989 | Hofrichter | |
| 5,071,092 | 12/1991 | Williams et al. | |
| 5,096,142 | 3/1992 | Rodriguez | |
| 5,098,043 | 3/1992 | Arena | |
| 5,388,788 | 2/1995 | Rudolph | |

FOREIGN PATENT DOCUMENTS 2238991  9/1990  United Kingdom.

Primary Examiner—Galen L. Barefoot
Attorney, Agent, or Firm—Bernard A. Donahue

[57] ABSTRACT

The invention is an aircraft two part hinge line fairing design for preventing physical interference between the two fairing parts while eliminating unacceptable gaps between the the two fairing parts. The problems are made worse by the fact that the hinge line is not perpendicular to the longitudinal centerline of the fairing which is aligned with the airflow. The problems, such as gaps, are unsightly and also increase drag. These problems are solved by the use of two matching surfaces of the fairing having substantially the same curvature and radius in all directions. The slight difference in curvature, and radius, is appropriate to allow a smaller fairing part to extend into a larger fairing part for freedom of movement with respect to each other. Accordingly, the first of the two surfaces should have radii r1 equal to the distance from the hinge point D to the fairing surface, and the second of the two surfaces should preferably have radii r2 equal to the distance from the hinge point D to the second of the fairing surfaces plus approximately 0.15 inches or so to allow for clearance with the first fairing surface.

7 Claims, 4 Drawing Sheets

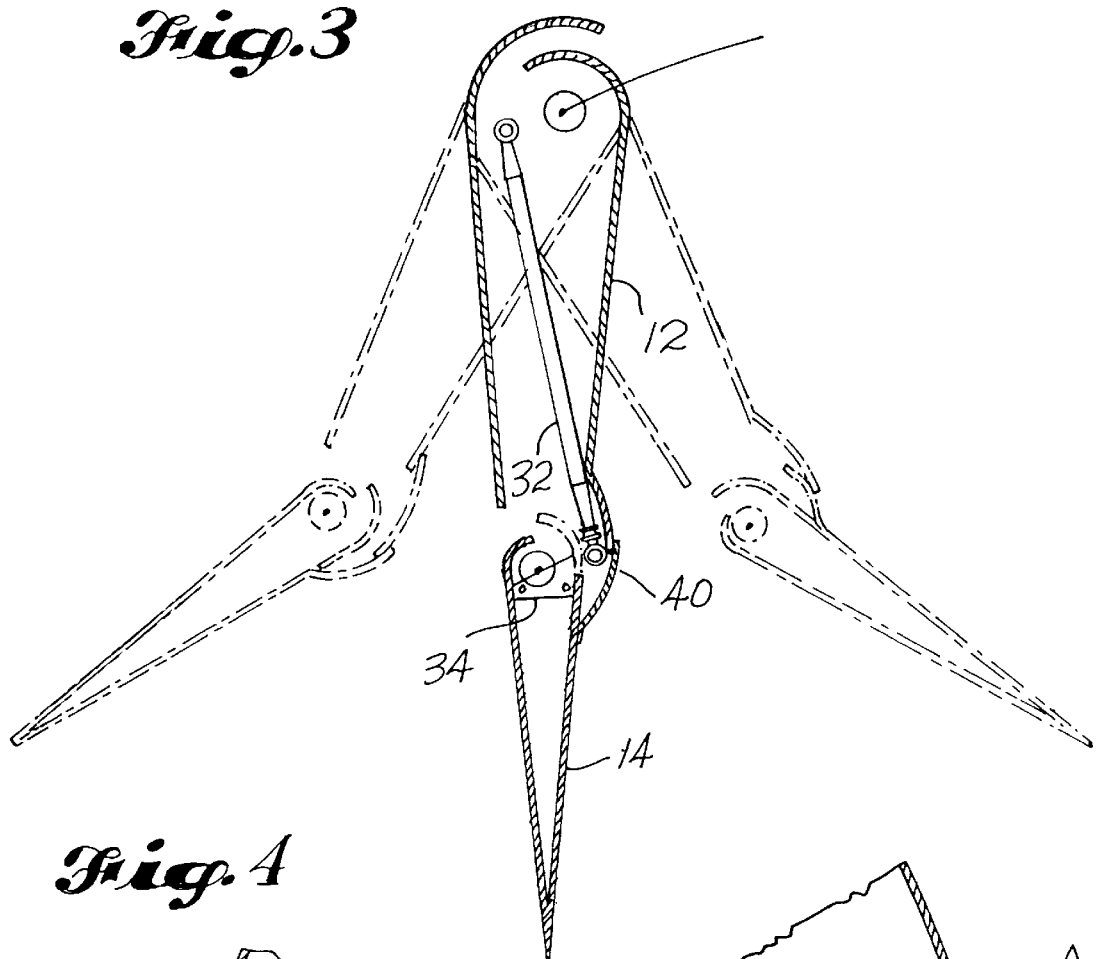
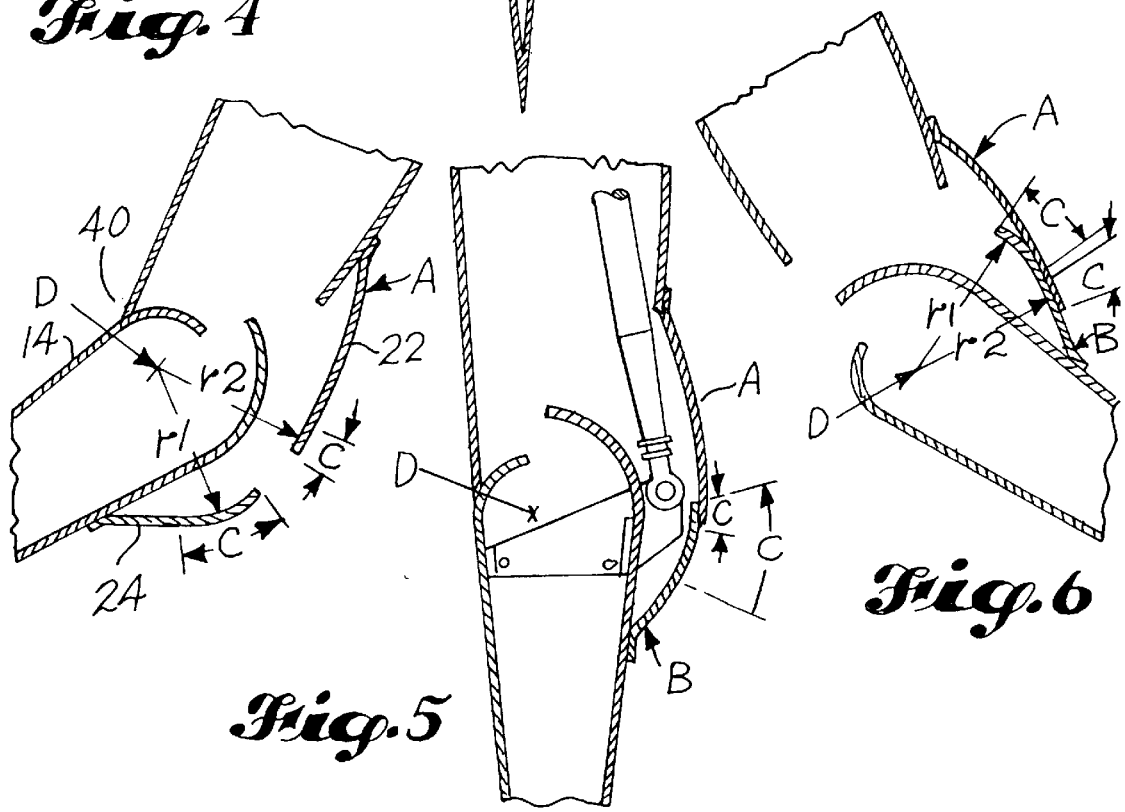

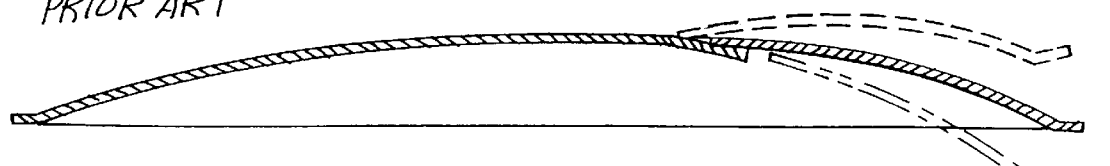
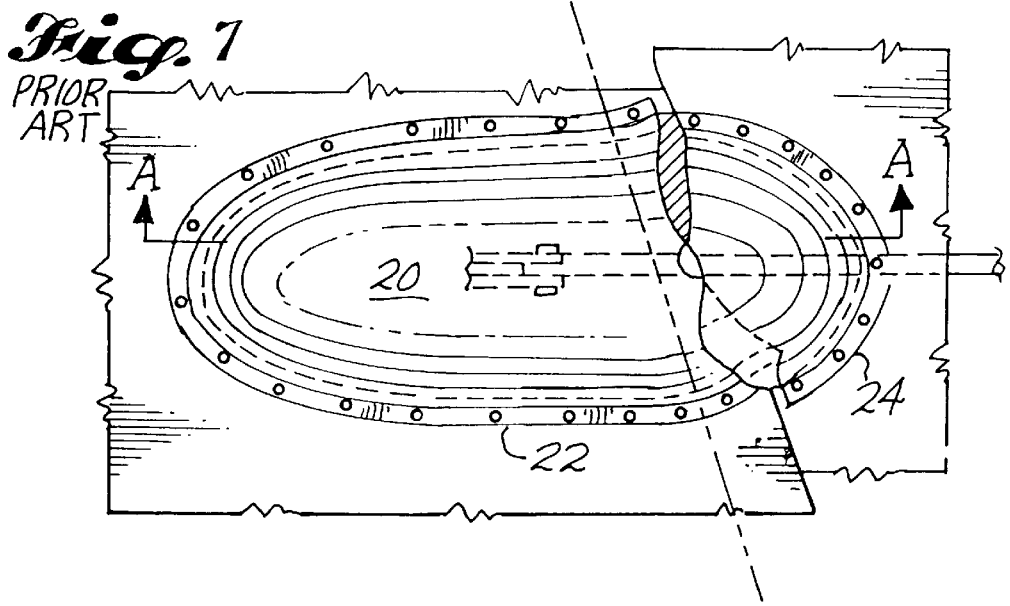
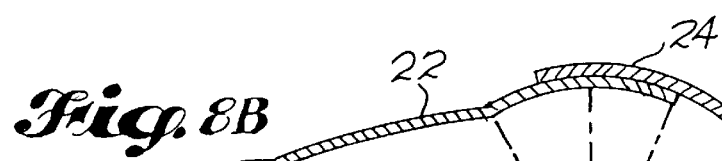
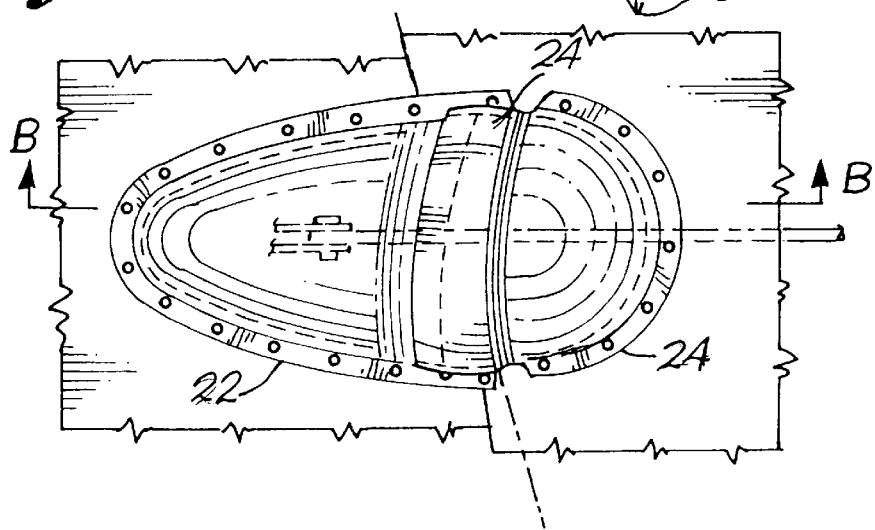

SPHERICAL MATING FAIRINGS FOR HINGELINE APPLICATIONS

FIELD OF THE INVENTION

This invention relates to aircraft aerodynamic fairings and, more particularly, to those fairings that are used in the area of hinged control surfaces where actuator or control links outside protrude of desired aerodynamic contours.

BACKGROUND OF THE INVENTION

Exterior aerodynamic fairings mounted across hinged surfaces can have unacceptable gaps between the fairing attached to the rudder and the mating fairing attached to the rudder tab. Ideally, these two mating fairings should match to the extent that they overlap to provide a continuous contour, and they do not interfere with each other during their full range of required relative motion about the hinge line. This problem is especially pronounced when the hinge line is not perpendicular to the longitudal axis of the fairing parts, which must be aligned with the air flow to keep aerodynamic drag to an acceptable level. In a recent aircraft design effort, the push rod fairings on the rudder and tab were originally designed with a contour that minimized the frontal area for drag purposes. These two-piece fairings required redesigned edge shapes to eliminate physical interferences during movement about the hinge line. This resulted in gaps which can cause undue air leakage and drag, and also darkened gap areas that create an unfavorable aesthetic impression for airline customers.

U.K. Patent Application GB 2238991A to Williams et al. describes fairings designed to cover a wing control surface actuating mechanism that has one segment attached to the wing, and one segment to a control surface and a center section made out of a flexible material that slides inside the other sections and deforms as needed to match their shapes.

U.S. Pat. No. 5,071,092 to Williams et al. (two common co-inventors with U.K. patent discussed above) also related to the wing to control surface actuator fairing. Multiple, overlapping layers of thin strips attached to the wing side of the fairing and projecting back over the surface of the control surface side. They are pushed aside by the rear fairing section when the control surface moves, but their spring force keeps them pressed against it.

U.S. Pat. No. 4,854,528 to Hofrichter discusses a fairing for a flap control system that is divided into three segments, the motions of which are controlled by the flap mechanism so that they move with it and slide within one another to maintain a continuous fairing.

U.S. Pat. No. 5,388,788 to Rudolph, assigned to the asignee of this invention, discloses a fairing for a hinged control surface in which the lower surface of the movable surface is also cylindrically curved. Thus, a flush surface is presented at all angles of the control surface, and there is, available between the two curved fairing surfaces, a curved load path for the actuating mechanism so that it does not need to penetrate the outer envelope of the normal aerodynamic surface.

The problems discussed above are illustrated and described in terms of a rudder and rudder tab assembly. Similar problems may also apply to other types of control surfaces such as ailerons, leading and trailing edge flaps, elevators and the like.

SUMMARY OF THE INVENTION

This invention is a fairing design for use on hinged surfaces and, more particularly, to a design of a fairing attached to a relatively fixed airfoil and a mating fairing attached to a relatively moveable control surface. The invention utilizes portions of two concentric spherical surfaces, each with their centers located on the hinge line, to allow one of the fairings to rotate within the other fairing.

BRIEF DESCRIPTION OF THE DRAWINGS

FIG. 3 is a plan view cross-section of a rudder and tab push rod apparatus with the range of motion shown in phantom lines.

FIGS. 4, 5 and 6 show the geometry of the fairings of this invention in their neutral, and maximum travel positions.

FIG. 7 shows a side elevation view of prior art hinge line fairing.

FIG. 8 shows a side elevation view of the hinge line fairing of this invention.

FIG. 7-A is a cross-section view, taken at 7-A in FIG. 7, of a prior art hinge line fairing installation.

FIG. 8-B is a cross-section view, taken at B—B in FIG. 8, of a hinge line installation according to this invention.

DESCRIPTION OF PREFERRED EMBODIMENTS

Figure 1:
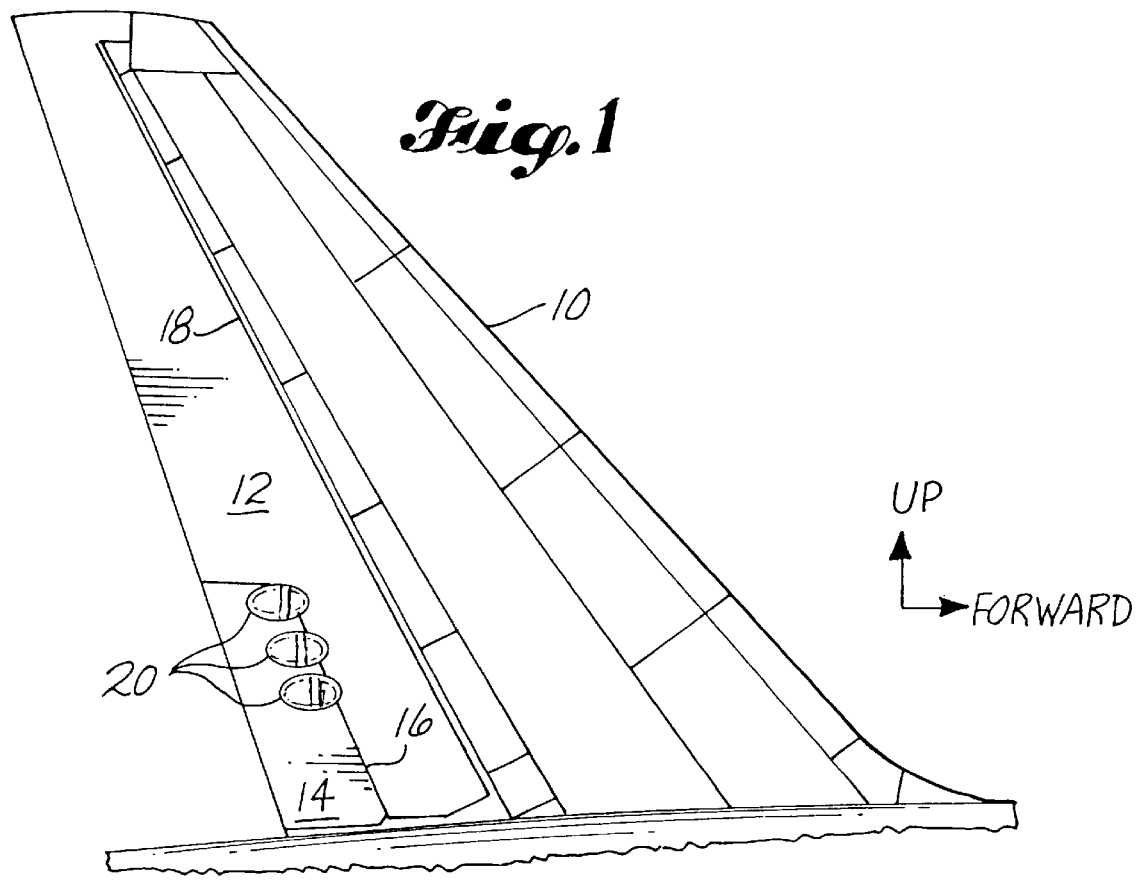
FIG. 1 is a side elevation view of the vertical tail of a modern commercial jet airplane showing three hinge line fairing installations.

FIG. 1 shows, in side elevation, the vertical tail 10 which includes a rudder 12, a rudder tab 14, a hinge line 16 between the rudder 12 and its tab 14, a hinge line 18 between the vertical tail 10 and the rudder 12, and three rudder to tab hinge line fairings 20.

In this area of the aircraft there are two control surfaces, the rudder 12 and the rudder tab 16. The rudder 12, for this aircraft is like a large aerodynamic box, about eight inches thick. The rudder tab 14 has a wedge shape, about eight inches thick at the front edge and tapering to a point at the back edge. The front edge of the rudder tab 14 attaches to a back edge of the rudder 12. The tab is mounted on a set of hinges to swing in opposite directions. The hinges and the hinge line 18 are inside the aerodynamic contours of the aircraft. However, a push rod actuation mechanism, not shown in FIG. 1, for moving the tab 14, is too large to fit within the aerodynamic contours of the rudder 12 and the rudder tab 14. Accordingly, an aerodynamic fairing must be installed to smooth the airflow over the protuberance caused by the push rod.

Figure 2:
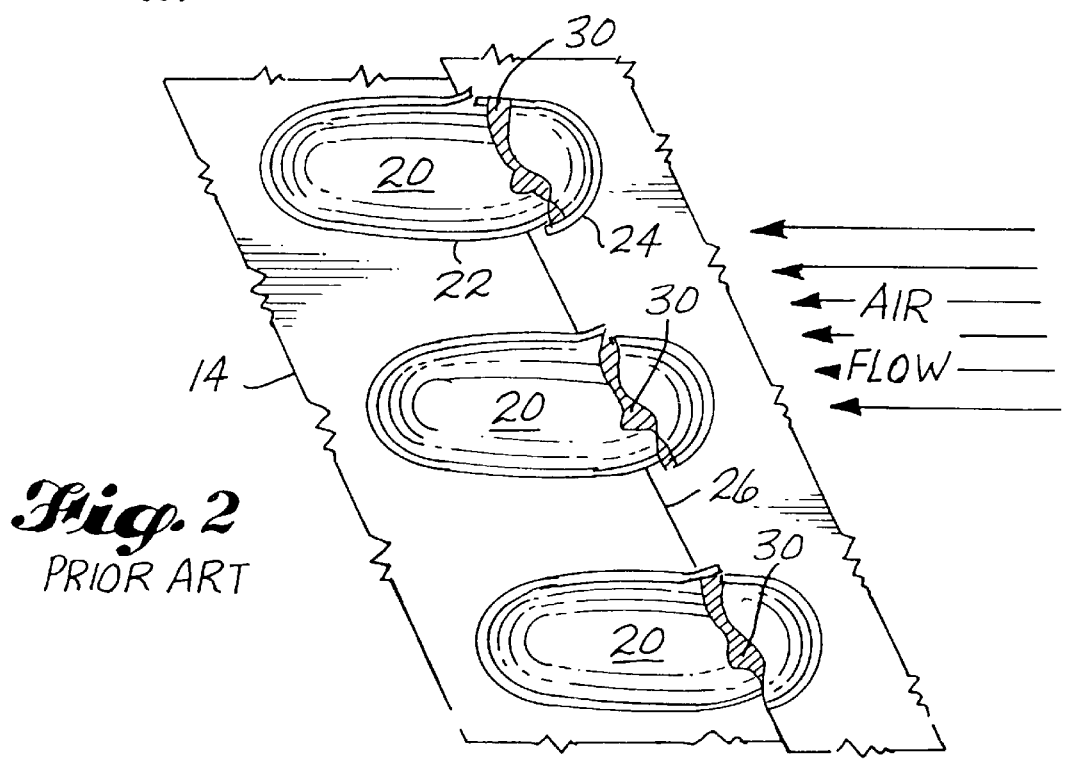
FIG. 2 is a cutaway expanded side elevation view of three prior art hinge line fairing installations.

FIG. 2 shows prior art fairings 20 placed over the protuberances formed by the push rods (not shown). The fairing 20 has two parts, i.e., a first fairing part 22 attached to the rudder 12 and a second fairing part 24 attached to the tab 14. In operation, as the tab 14 rotates about hinge line 26, it is essential that the two parts of the fairings 20 do not physically interfere with each other It is also highly desired that the fairing parts 24 and 24 do not depart from one another to leave openings, such as those labled 30, for air leakages which contribute to aerodynamic drag. Also, such openings are unsightly and offensive to the aesthetics for airline passengers.

Unfortunately, however, due in large part to the fact that the fairing 20 must be aligned with the airflow for reduced aerodynamic drag, rather than aligned perpendicular to the hinge line 26, it is extremely difficult to determine how to shape the fairings so they will not depart from each other leaving unsightly and drag productive openings between the first and second fairing parts.

FIG. 3 shows a plan view cross-section of a rudder 12 tab 14, push rod 32, push rod crank 34. The solid lines illustrate the nominal center position for the rudder 12 and tab 14. The phantom lines show the maximum travel of the rudder 12 and tab 14 to the left and right respectively. FIG. 3 also schematically depicts a two part fairing 40 made in accordance with this invention.

FIG. 4 shows a first fairing part 22 attached to the rudder 12 and a second fairing part 24 attached to the tab 14. The areas of the fairing marked "C" are spherical surfaces having a radius of r1 and r2, measured from point D which is on the hinge line 16. r1 is smaller than r2 only by the thickness of the skin of the fairing, plus a minimal clearance (approximately 0.15), so the first fairing part 24 will snugly fit into the second fairing part 22.

FIG. 5 shows the push rod and push rod crank 34 in their nominal position. As in FIG. 4 the fairing parts 24 and 22 can be seen to utilize spherical mating surfaces at the areas marked "C".

FIG. 6 likewise shows radii r1 and r2 to the fairing, measured from the center point on the hinge line.

FIGS. 7 and 7-A show a prior art fairing installation and cross-section in which trimming to eliminate physical interference between the two fairing parts has occurred. As mentioned previously, such trimming leads to openings that are unsightly and also create drag.

Figure 9:
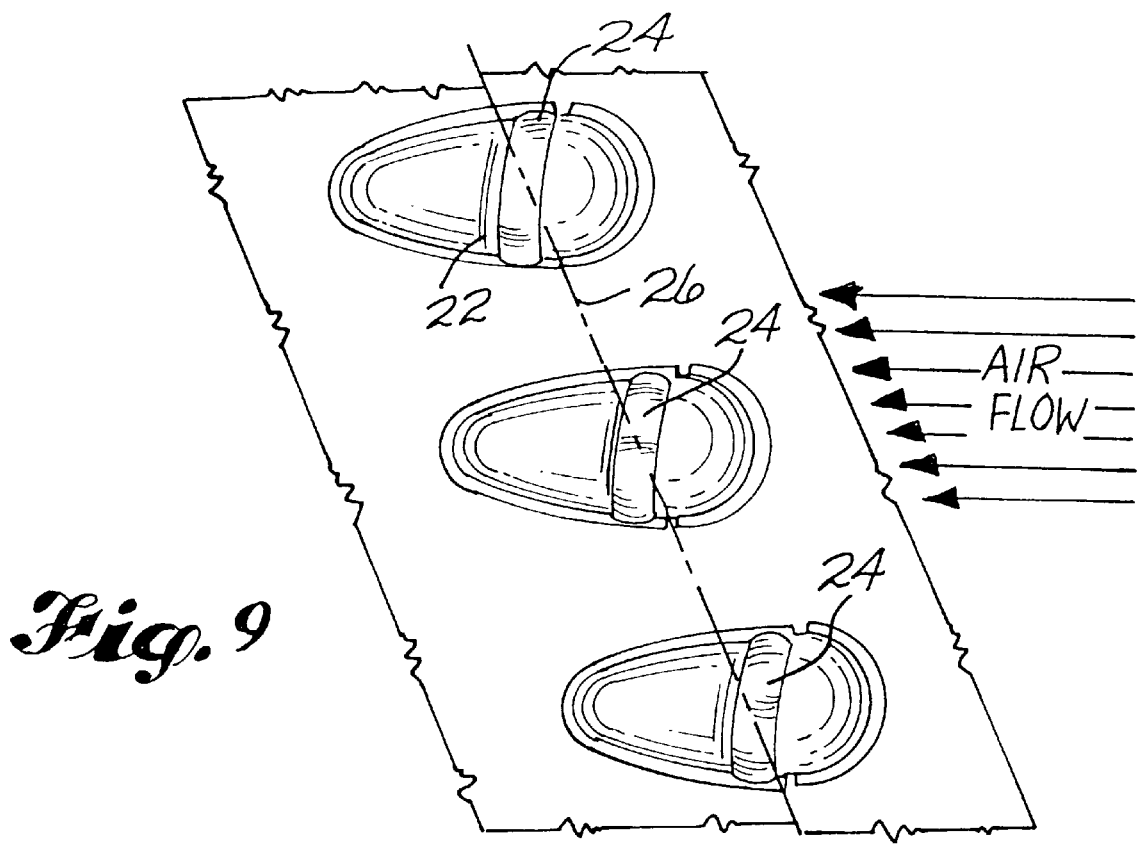
FIG. 9 is a cut away expanded side elevation view of three prior art hinge line fairing installations made in accordance with the concepts of this invention.

FIGS. 8 and 8-B illustrate the fairing installation of this invention in which spherical matching surfaces are used in order to avoid trimming for physical interference and leaving open holes between fairing parts. FIG. 9 shows three fairings made in accordance with the concepts of this invention.

The embodiments of the invention in which an exclusive property or privilege is claimed are as follows:

1. Aircraft apparatus for two part hinge line fairings comprising:

a first fairing part attached on a first side of said hinge line;

a second fairing part attached to the other side of said hinge line wherein said first and second fairing parts each have portions of mating concentric spherical surfaces each with their centers located on the hinge line, to allow one of the fairings to rotate within the other fairing.

2. The apparatus of claim 1 wherein said spherical contour of said second fairing has increased radii by an amount equal to the thickness of the fairing skin plus a reasonable amount of clearance to prevent the first fairing part from rubbing against said second fairing part.

3. The apparatus of claim 2 wherein said first and second fairing parts overlap each other such that a person observing the fairing installation will not be able to see into the inside of said fairing installation.

4. Aircraft apparatus and a two part hinge line fairing for preventing physical interference between the two fairing parts while eliminating gaps between the two fairing parts comprising:

a first fairing part attached on one side of said hinge line and having a spherical contour with radii of said contour being approximately equal to the distance from the centerline;

a second fairing part attached on the other side of said hinge line and having a spherical contour with the radii of said contour being approximately equal to the shortest distance from the centerline to the spherical contour of said second part.

5. The apparatus of claim 1, wherein said spherical contour of said second fairing has increased radii by an amount equal to the thickness of the fairing skin plus a reasonable amount of clearance to prevent the first fairing part from rubbing against said second fairing part.

6. The apparatus of claim 1, wherein said first and second fairing parts overlap each other such that a person observing the fairing installation will not be able to see into the inside of said fairing installation.

7. The apparatus of claim 2, wherein the reasonable amount of clearance is approximately 0.15 inches.

* * * * *